United States Patent
Yamanaka

(10) Patent No.: US 6,690,503 B2
(45) Date of Patent: Feb. 10, 2004

(54) FAULT TOLERANT OPTICAL AMPLIFIER

(75) Inventor: Koji Yamanaka, Tokyo (JP)

(73) Assignee: The Furukawa Electric Co., Ltd., Tokyo (JP)

(*) Notice: Subject to any disclaimer, the term of this patent is extended or adjusted under 35 U.S.C. 154(b) by 0 days.

(21) Appl. No.: 10/011,979

(22) Filed: Dec. 11, 2001

(65) Prior Publication Data

US 2002/0167720 A1 Nov. 14, 2002

(30) Foreign Application Priority Data

May 14, 2001 (JP) ........................................ 2001-143735

(51) Int. Cl.[7] .................................................. H01S 3/00
(52) U.S. Cl. ........................................................ 359/334
(58) Field of Search .............................. 359/341.33, 334

(56) References Cited

U.S. PATENT DOCUMENTS

| | | | | |
|---|---|---|---|---|
| 5,241,414 A | * | 8/1993 | Giles et al. | 359/341.33 |
| 6,426,833 B1 | * | 7/2002 | Bao | 359/341.32 |
| 2002/0181859 A1 | * | 12/2002 | Clark et al. | 385/27 |
| 2003/0067671 A1 | * | 4/2003 | Islam et al. | 359/337 |

FOREIGN PATENT DOCUMENTS

| | | | | |
|---|---|---|---|---|
| JP | 7-99787 | 10/1995 | ............. | H01S/3/30 |
| JP | 2000-314902 | 11/2000 | ............. | G02F/1/35 |
| JP | 2001230480 A | * | 8/2001 | ............. H01S/3/30 |

OTHER PUBLICATIONS

Emori et al. 100nm bandwidth flat–gain Raman amplifiers pumped and gain–equalised by 12–wavelength–channel WDM laser diode unit. Electronics Letters. 5th Aug. 1999. vol. 35. No. 16. pp. 1355–1356.*

U.S. patent application No. 10/011,980 filed Dec. 11, 2001.*
U.S. patent application No. 09/985,752 filed Nov. 6, 2001.*

* cited by examiner

Primary Examiner—Thomas G. Black
Assistant Examiner—Deandra M. Hughes
(74) Attorney, Agent, or Firm—Oblon, Spivak, McClelland, Maier & Neustadt, P.C.

(57) ABSTRACT

In an HPU for multiplexing a plurality of laser lights having different oscillation center wavelengths and outputting a pumping light obtained, there are provided laser units having a shortest oscillation center wavelength and a longest oscillation center wavelength respectively, in addition to a plurality of laser units that constitute a pumping light source. When the output of at least one of the plurality of laser lights has been stopped due to a detection of a trouble or a reduction in the output, the power of laser lights other than the stopped laser light are altered so as to secure the amplification in the desired bandwidth and with the desired gain.

2 Claims, 5 Drawing Sheets

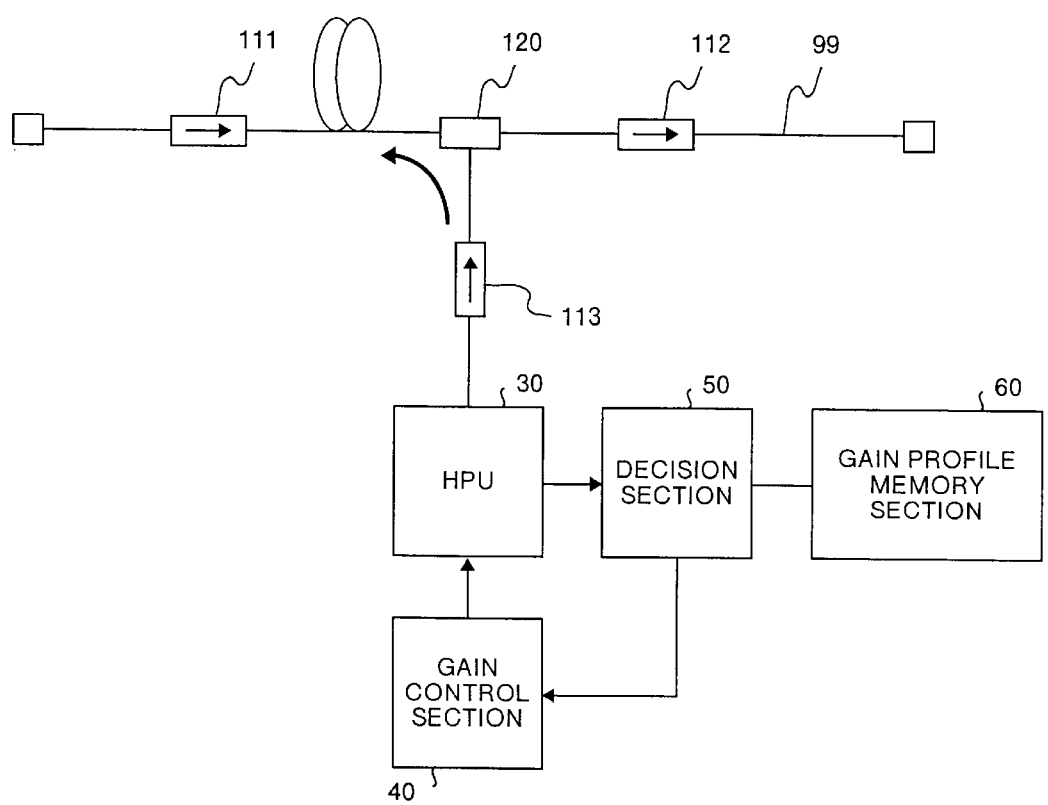

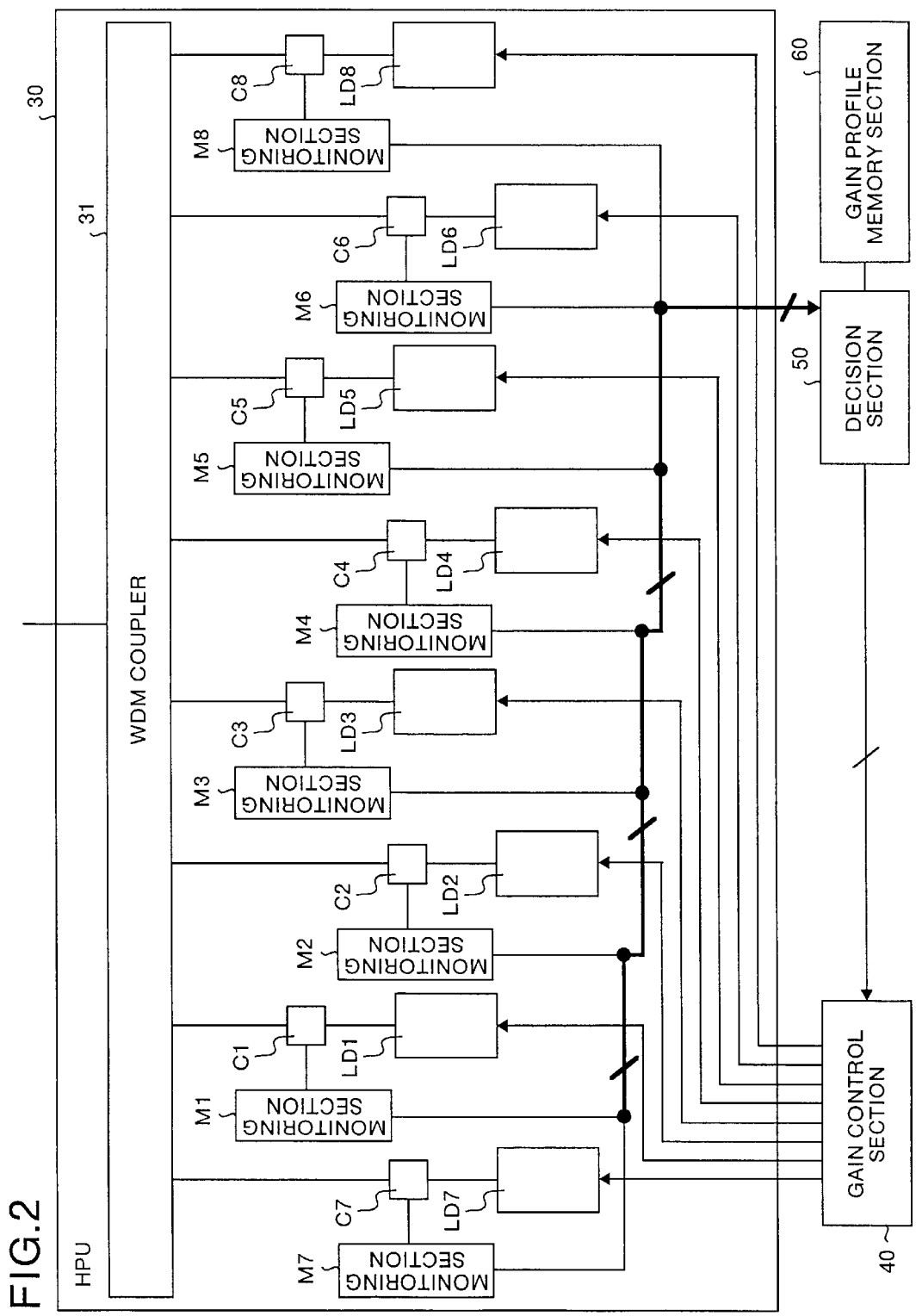

FIG.3A

| LD | OUTPUT POWER |
|---|---|
| 1 | 100mW |
| 2 | 100mW |
| 3 | 75mw |
| 4 | 50mW |
| 5 | 50mW |
| 6 | 50mW |
| ⑦ | OFF |
| ⑧ | OFF |

GAIN PROFILE BEFORE THE OCCURRENCE OF TROUBLE

FIG.3B

| LD | OUTPUT POWER |
|---|---|
| 1 | OFF |
| 2 | 120mW |
| 3 | 75mw |
| 4 | 50mW |
| 5 | 50mW |
| 6 | OFF |
| ⑦ | 120mW |
| ⑧ | 75mW |

GAIN PROFILE AFTER THE OCCURRENCE OF TROUBLE IN LD1 AND LD6

FAULT TOLERANT OPTICAL AMPLIFIER

FIELD OF THE INVENTION

The present invention relates to an optical amplifier device for compensating for a predetermined gain profile that is required in an optical transmission system even if any one of a plurality of laser units that constitute a pumping light source is in trouble.

BACKGROUND OF THE INVENTION

In recent years, along a rapid diffusion of the Internet and a rapid increase in the number of connections between LANs within enterprises, the transmission capacity of contents data like dynamic images has increased, not only a mere increase in the number of communication calls. Consequently, this has brought about a problem of a rapid increase in data traffics. Under this situation, a WDM (wavelength division multiplex) system has been developed remarkably and has come to be widely distributed, for preventing a reduction in the communication performance attributable to the increase in the data traffics.

The WDM system realizes a large-capacity transmission of information that is a hundred times a conventional transmission capacity, with one fiber, by allocating a plurality of optical signals to waves of mutually different wavelengths. Particularly, the existing WDM system uses an erbium-doped fiber amplifier (hereinafter to be referred to as an EDFA) to achieve a wide-band and long-distance transmission. The EDFA is an optical amplifier that utilizes the following principle. Namely, when a pumping laser of a wavelength 1480 nm or a wavelength 980 nm is used to transmit a light through a special optical fiber added with an element called erbium, a light of a wavelength 1550 nm band as a transmission signal is amplified in this special fiber.

In the mean time, the EDFA is a concentration-type optical amplifier in which portions for exciting an optical signal are concentrated. Therefore, there has been a limit to this EDFA in that there is a loss of a transmission path optical fiber leading to the accumulation of noise, and the EDFA is subjected to non-linearity that becomes the cause of signal distortion and noise. Further, the EDFA makes it possible to carry out optical amplification in a wavelength band that is determined by band gap energy of erbium, and it has been difficult to obtain a wide band for realizing further multiplexing.

As an optical amplifier device that replaces the EDFA, attention has been paid to a Raman amplifier. The Raman amplifier is a distribution-type optical amplifier that uses a normal transmission line fiber as a gain medium, without requiring a special fiber like an erbium-doped fiber that is used in the EDFA. Therefore, as compared with the WDM transmission system that is based on the conventional EDFA, the Raman amplifier can improve the transmission quality.

FIG. 5 is a block diagram showing a schematic structure of a conventional Raman amplifier. In FIG. 5, the Raman amplifier is structured by an optical multiplexer 120, optical isolators 111 to 113, and a High Power Unit (HPU) 130 that are provided on a transmission line 99.

FIG. 6 is a diagram showing a structure example of the HPU 130. In FIG. 6, the HPU 130 is composed of six laser units LD1 to LD6 having different oscillation center wavelengths, and a Mach-Zehnder-type WDM coupler 131.

Each of the laser units LD1 to LD6 has two Fabry-Perot type semiconductor lasers 134 having the same oscillation center wavelength. Each laser unit stabilizes a laser output of each semiconductor laser 134 with a fiber brag grating (FBG) 133. At the same time, a polarization multiplexer (PBC) 132 multiplexes the laser outputs and produces one output. The polarization multiplexing by the PBC 132 is a measure for increasing the pumping power of each oscillation center wavelength, and for reducing the polarization dependency of Raman gain. As explained above, the HPU 130 is composed of a plurality of laser units having different oscillation center wavelengths, as it is necessary to amplify the signal light of a plurality of multiplexed wavelengths (channels)

Laser outputs obtained from the laser units LD1 to LD6 are further multiplexed by the WDM coupler 131, and a high-output multiplexed pumping light is output. The pumping light output from the HPU 130 is transmitted through an optical fiber of the transmission line 99 via the optical multiplexer 120. FIG. 5 shows an example of a backward pumping. A pumping light multiplexed by the optical multiplexer 120 is transmitted through the transmission line 99 to a direction opposite to the proceeding direction of the signal light.

When the high-output pumping light is transmitted through the transmission line 99, a Raman scattered light shifted to a long wavelength side by 110 nm from the pumping light is generated, based on material characteristics of the optical fiber of the transmission medium. Then, through an induction Raman scatter process, the energy of the pumping light is shifted to the signal light. Based on this, the signal light is amplified.

As explained above, a Raman amplifier is an amplifier capable of amplifying a signal light as it is, using an established optical fiber as an amplification medium. The Raman amplifier is different from the EDFA in the aspects of am amplification medium, a number of pumping light sources used, and pumping power. For the light source for exciting an erbium-doped fiber amplifier in the EDFA, it is also possible to use a one having a similar structure to that of the HPU 130.

SUMMARY OF THE INVENTION

It is an object of this invention to provide an optical amplifier device capable of sustaining an optical transmission without deteriorating signal transmission quality, even if any one of a plurality of laser units that constitute a pumping light source is in trouble.

In order to achieve the above object, according to one aspect of the present invention, there is provided an optical amplifier device that comprises a pumping light source for multiplexing a plurality of laser lights having different oscillation center wavelengths and outputting a pumping light obtained, and that amplifies a signal light propagated on a transmission line in a desired bandwidth and with a desired gain determined by the pumping light, wherein, when the output of at least one of the plurality of laser lights has been stopped, the optical amplifier device alters the power of at least one of laser lights other than the stopped laser light so as to secure the amplification in the desired bandwidth and with the desired gain.

Further, according to another aspect of the invention, there is provided an optical amplifier device comprising, a pumping light source that includes a plurality of laser light sources for outputting laser lights having mutually different oscillation center wavelengths, and a monitoring section for detecting output power of each laser light source, and that multiplexes laser lights output from the plurality of laser light sources, and outputs an obtained multiplexed light as a pumping light, a control unit which controls the output power of the plurality of laser light sources according to an input control signal, and a decision unit which specifies a laser light source of which output is to be stopped out of the plurality of laser light sources, based on the output power detected by the monitoring section, selecting a gain profile in the case of the specified laser light source being in a stopped status, from among a plurality of gain profiles stored in advance, and outputting output power information of each laser light source shown by the selected gain profile, as the control signal.

Other objects and features of this invention will become understood from the following description with reference to the accompanying drawings.

BRIEF DESCRIPTION OF THE DRAWINGS

FIG. 1 is a block diagram showing a schematic structure of an optical amplifier device according to an embodiment of the present invention;

FIG. 2 is a diagram showing a structure example of an HPU of the optical amplifier device according to the embodiment;

FIG. 3A and FIG. 3B are diagrams showing an example of gain profiles that are given to a gain control section of the optical amplifier device according to the embodiment;

DETAILED DESCRIPTION

The present invention has been achieved in order to solve the following problems.

However, in the optical amplifier device like the EDFA and the Raman amplifier, a gain profile changes when any one of the laser units in the HPU 130 is in trouble. As a result, there has been a problem that it is not possible to execute a targeted amplification, and this leads to deterioration of signal transmission quality.

Figure 6:
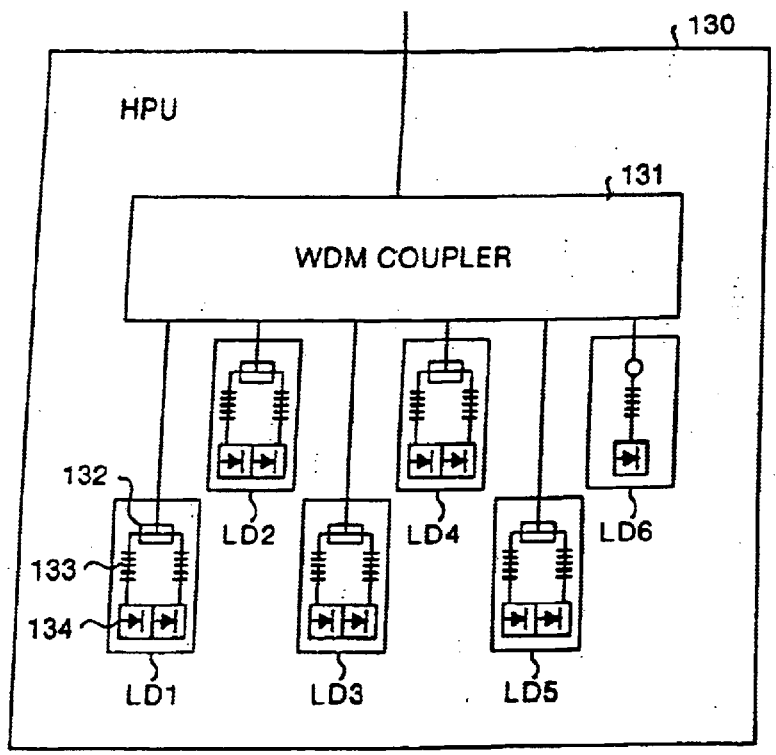
FIG. 6 is a diagram showing a structure example of a conventional HPU.
Figure 7:
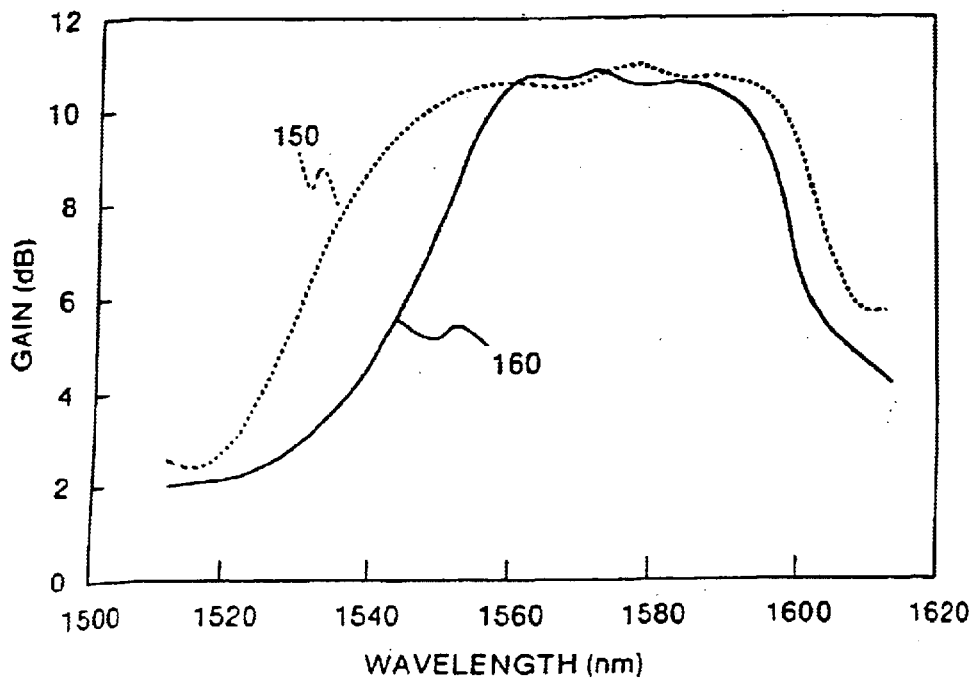
FIG. 7 is a diagram for explaining problems of a conventional optical amplifier.

FIG. 7 is a diagram showing an example of again profile that explains this problem. Assume that the oscillation center wavelengths of the laser units LD1 to LD6 in the HPU 130 shown in FIG. 6 are 1435 nm, 1442.5 nm, 1450 nm, 1455 nm, 1465 nm, and 1480 nm, respectively. Then, a substantially flat gain profile is obtained over the bandwidth from 1540 nm to 1600 nm, as shown in a dotted line 150 in FIG. 7.

However, assume that it has become impossible to obtain an oscillation output of a predetermined or above value as the laser unit LD1 at the shortest wavelength side and the laser unit LD6 at the longest wavelength side have finished their lives or are in trouble respectively. In this case, the gain profile collapses to a large extent at the short wavelength side and the long wavelength side, as shown by a solid line 160 in FIG. 7. Consequently, an effective bandwidth is narrowed. In other words, the signal power is lowered at the short wavelength side and the long wavelength side.

An embodiment of an optical amplifier device according to the present invention will be explained in detail below with reference to the drawings. Particularly, an optical amplifier device for carrying out Raman amplification will be taken as an example. It should be noted that the present invention is not limited to this embodiment.

Figure 5:
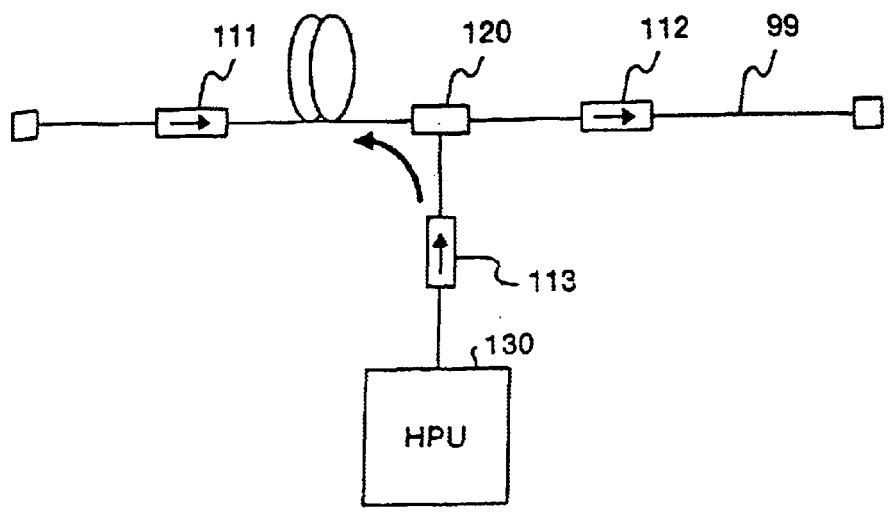
FIG. 5 is a block diagram showing a schematic structure of a conventional Raman amplifier.

FIG. 1 is a block diagram showing a schematic structure of an optical amplifier device according to the embodiment. In FIG. 1, portions that are common to those in FIG. 5 are attached with like reference numbers, and their explanation will be omitted. FIG. 1 is different from FIG. 5 in that an HPU 30 added with protection laser units to be described later is provided in place of the conventional HPU 130, and that a gain control section 40, a decision section 50, and a gain profile memory section 60 are further provided.

The gain control section 40 is a unit which controls a gain of each laser unit of the HPU 30 according to an instruction of the decision section 50. The decision section 50 is a unit which monitors a trouble in each laser unit of the HPU 30, and instructing a gain control based on a gain profile stored in the gain profile memory section 60 to the gain control section 40, when a trouble has occurred. The gain profile is a profile showing desired output power to be output to each laser unit of the HPU 30.

FIG. 2 is a diagram showing a structure example of the HPU 30. In FIG. 2, the HPU 30 is provided with two laser units LD7 and LD8 (hereinafter, the laser units LD7 and LD8 will be particularly referred to as protection laser units), in addition to the six laser units LD1 to LD6 shown in FIG. 6. The HPU 30 is further provided with a Mach-Zehnder-type WDM coupler 31 for multiplexing laser lights oscillated by the laser units LD1 to LD8.

Each of the laser units LD1 to LD8 has two Fabry-Perot type semiconductor lasers having the same oscillation center wavelength, and stabilizes a laser output of each semiconductor laser with a fiber brag grating (FBG), as shown in FIG. 6. At the same time, a polarization multiplexer (PBC) multiplexes the laser outputs and produces one output.

In this case, particularly, the new added laser unit LD7 oscillates in an oscillation center wavelength shorter than a shortest wavelength among the oscillation center wavelengths of the laser units LD1 to LD6. On the contrary, the new added laser unit LD8 oscillates in an oscillation center wavelength longer than a longest wavelength among the oscillation center wavelengths of the laser units LD1 to LD6. Taking the example used for explaining FIG. 6, the oscillation center wavelengths of the laser units LD1 to LD6 are 1435 nm, 1442.5 nm, 1450 nm, 1455 nm, 1465 nm, and 1480 nm, respectively. In this case, the oscillation center wavelength of the laser unit LD7 is 1427.5 nm, and the oscillation center wavelength of the laser unit LD8 is 1495 nm, for example.

In other words, based on the additional provision of the laser units LD7 and LD8, the HPU 30 can provide a gain profile of a broader bandwidth as compared with the case where the HPU has only the laser units LD1 to LD6.

Further, in FIG. 2, optical couplers C1 to C8 are provided on the output transmission lines of the laser units LD1 to LD8 respectively. Further, the optical couplers C1 to C8 have monitoring sections M1 to M8 connected to their branch lines respectively. In other words, laser lights output from the laser units LD1 to LD8 are input to the monitoring sections M1 to M8 via the optical couplers C1 to C8 respectively. The monitoring sections M1 to M8 are units for receiving signal lights branched by the optical couplers C1 to C8, and are structured by light receiving elements like photodiodes.

The decision section 50 inputs signal light power values detected by the monitoring sections M1 to M8, and compares the input signal light power values with a predetermined value. The decision section 50 can detect a trouble based on this.

The operation of the optical amplifier according to the present embodiment will be explained below. FIG. 3A and FIG. 3B are diagrams showing an example of gain profiles that are given to the gain control section 40. Assume that the laser units LD1 to LD8 within the HPU 30 operate in normal condition, and these laser units output laser lights based on output power according to a gain profile shown in FIG. 3A. As shown in FIG. 3A, in the status that none of the laser units LD1 to LD6 is particularly in trouble, the protection laser units LD7 and LD8 are set to an OFF status in which these laser units do not carry out laser oscillation.

In other words, this status is equivalent to that of the HPU 130 shown in FIG. 6, and the multiplexed light output from the WDM coupler 31 also shows a flat gain profile in the desired bandwidth as shown by the dotted line 150 in FIG. 7.

In the above status, the decision section 50 compares each signal light power value output from each of the monitoring sections M1 to M6 with a predetermined value, and decides whether each signal light power value has reached the predetermined value or not. When there exists a laser unit that outputs a signal light that has not reached the predetermined value (or when there exists a laser unit that does not output a signal light at all) as a result of the decision made, the decision section 50 extracts a gain profile that is to be employed in the case of stopping the operation of this laser unit, from the gain profile memory section 60.

For example, when the decision section 50 has decided that the signal light power of the laser units LD1 and LD6 have not reached the predetermined value due to a trouble or the like, the decision section 50 sets the laser units LD1 and LD6 to the OFF status, as shown in FIG. 3B. At the same time, the decision section 50 extracts a gain profile in which suitable output power are set to the protection laser units LD7 and LD8 that have so far been in the OFF status, from the gain profile memory section 60.

Figure 4:
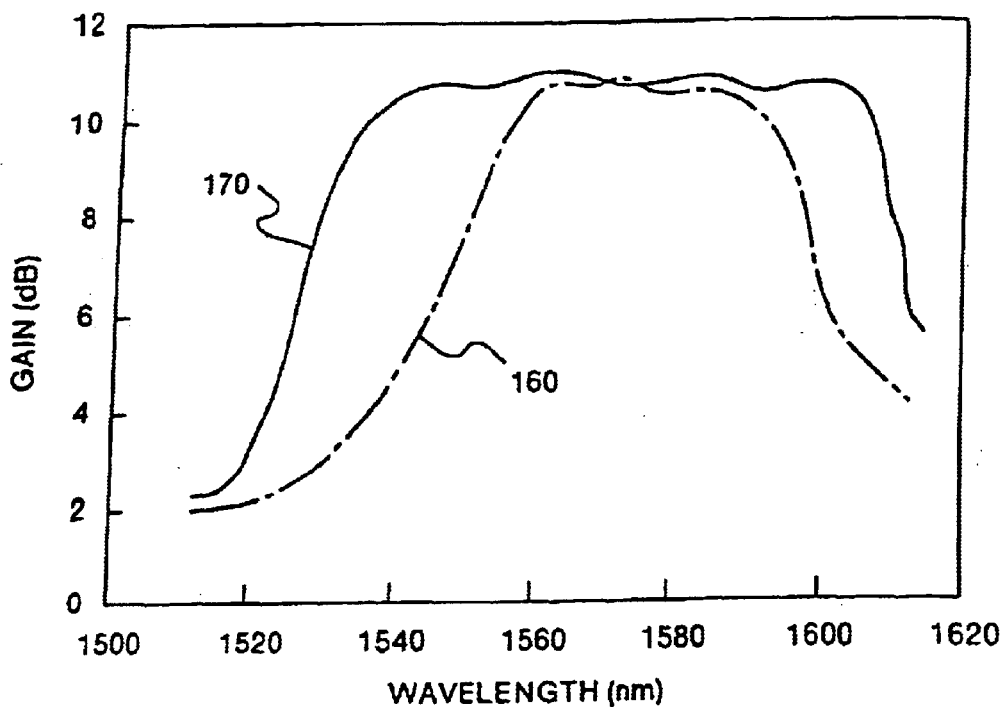
FIG. 4 is a diagram showing an example of a gain profile that is stored in the optical amplifier device according to the embodiment.

In this case, it is necessary that the gain profile stored in the gain profile memory section 60 covers at least the bandwidth that becomes effective in the gain profile that is obtained in the status that the laser units LD1 to LD6 are operated and the protection laser units LD7 and LD8 are set to the OFF status. In other words, it is necessary to cover the bandwidth that becomes effective in the gain profile shown in FIG. 3A and the dotted line 150 in FIG. 7. For example, the gain profile in FIG. 3B shows a flat gain in the above bandwidth as shown by a solid line 170 in FIG. 4.

Particularly, in the optical amplifier device according to the present embodiment, the oscillation center wavelength of the protection laser unit LD7 is set shorter than the shortest oscillation center wavelength of the laser unit other than the protection laser units. Further, the oscillation center wavelength of the protection laser unit LD8 is set longer than the longest oscillation center wavelength of the laser unit other than the protection laser units. Therefore, even if the laser units for outputting the shortest and the longest oscillation center wavelengths are in trouble, it becomes possible to secure the initial bandwidth by operating the protection laser units LD7 and LD8, as shown in FIG. 3B.

As explained above, according to the optical amplifier device according to the present embodiment, when it is necessary to stop the operation of a laser unit because of an occurrence of a trouble or a reduction in the output in any one of the laser units that constitute the HPU 30, a distortion generated in the gain profile due to this stopping is corrected by adjusting the gain control of other laser units. At the same time, depending on the needs, the protection laser units that have the shortest oscillation center wave and the longest oscillation center wavelength, are operated. With this arrangement, it becomes possible to secure the amplification based on the desired flat gain profile, in the bandwidth obtained before the occurrence of the trouble.

Further, as the protection operation is automatically carried out inside the optical amplifier device, it is not necessary to carry out adjustment or exchange of laser units at the installation position of the optical amplifier device in order to secure the desired gain profile after the occurrence of the trouble. As a result, it becomes easy to maintain and manage the total optical transmission system that has been built up using the optical amplifier device.

In the above embodiment, a structure for carrying out Raman amplification has been explained as an optical amplifier device. It is also possible to obtain similar effects to those of the above in the structure of the EDFA, by replacing the pumping light source of the EDFA with the HPU 30, and additionally providing the gain control section 40, the decision section 50, and the gain profile memory section 60.

As explained above, according to the optical amplifier device according to the present invention, the laser light sources for generating pumping lights are provided at the short wavelength side and the long wavelength side in addition to the laser light sources that can secure a desired gain in the desired bandwidth. A distortion generated in the gain profile due to a stopping of any one of the plurality of laser light sources is corrected by adjusting the gain control of other laser units. At the same time, based on the needs, the protection laser units having the shortest oscillation center wave and the longest oscillation center wave, are operated respectively. With this arrangement, there is an effect that it becomes possible to secure the amplification based on the desired flat gain profile, in the bandwidth obtained before the occurrence of the trouble.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An optical amplifier device comprising:
    a pumping light source that includes a plurality of laser light sources for outputting laser lights having mutually different oscillation center wavelengths, and a monitoring section for detecting an output power of each laser light source, and that multiplexes laser lights output from the plurality of laser light sources, and outputs an obtained multiplexed light as a pumping light;
    a control unit which controls the output power of the plurality of laser light sources according to an input control signal; and
    a decision unit which specifies a laser light source of which output is to be stopped out of the plurality of laser light sources, based on the output power detected by said monitoring section, selecting a gain profile in the case of the specified laser light source being in a stopped status, from among a plurality of gain profiles stored in advance, and outputting output power information of each laser light source shown by the selected gain profile, as the control signal, wherein the pumping light source multiplexes laser lights output from laser light sources other than the specified laser light source, and outputs an obtained multiplexed light as a pumping light for amplifying a signal light propagated on a transmission line in a minimum required desired bandwidth and with a desired gain and a laser light source having a shortest oscillation center wavelength and a laser light source having a longest oscillation center wavelength, out of the plurality of laser light sources, are in a stopped status, when the other laser light sources are not in a stopped status.

2. An optical amplifier device comprising:

a pumping light source that includes a plurality of laser light sources for outputting laser lights having mutually different oscillation center wavelengths, and a monitoring section for detecting an output power of each laser light source, and that multiplexes laser lights output from the plurality of laser light sources, and outputs an obtained multiplexed light as a pumping light;

a control unit which controls the output power of the plurality of laser light sources according to an input control signal; and a decision unit which specifics a laser light source of which output is to be stopped out of the plurality of laser light sources, based on the output power detected by said monitoring section, selecting a gain profile in the case of the specified laser light source being in a stopped status, from among a plurality of gain profiles stored in advance, and outputting output power information of each laser light source shown by the selected gain profile, as the control signal, wherein the optical amplifier device carries out Raman amplification to the signal light propagated on said transmission line, using the pumping light and a laser light source having a shortest oscillation center wavelength and a laser light source having a longest oscillation center wavelength, out of the plurality of laser light sources, are in a stopped status, when the other laser light sources are not in a stopped status.

* * * * *